United States Patent
Bai et al.

(10) Patent No.: US 10,762,428 B2
(45) Date of Patent: Sep. 1, 2020

(54) CASCADE PREDICTION USING BEHAVIORAL DYNMICS

(71) Applicant: International Business Machines Corporation, Armonk, NY (US)

(72) Inventors: Kun Bai, Hartsdale, NY (US); Wei Tan, Elmsford, NY (US); Fei Wang, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1299 days.

(21) Appl. No.: 14/966,859

(22) Filed: Dec. 11, 2015

(65) Prior Publication Data

US 2017/0169335 A1  Jun. 15, 2017

(51) Int. Cl.
*G06N 5/02* (2006.01)
*H04L 12/58* (2006.01)

(52) U.S. Cl.
CPC ............. *G06N 5/022* (2013.01); *H04L 51/32* (2013.01)

(58) Field of Classification Search
CPC ........ G05Q 50/01; G06N 20/00; G06N 5/022; G06N 5/04; H04L 51/32
See application file for complete search history.

(56) References Cited

U.S. PATENT DOCUMENTS

| | | | |
|---|---|---|---|
| 6,581,008 B2 | 6/2003 | Intriligator | |
| 7,103,480 B2 | 9/2006 | Intriligator et al. | |
| 7,797,259 B2 | 9/2010 | Jiang | |
| 8,707,647 B2 | 4/2014 | Pathak et al. | |
| 8,712,952 B2 | 4/2014 | Soulie-Fogelman | |
| 8,756,184 B2 | 6/2014 | Li et al. | |
| 8,914,505 B2* | 12/2014 | Altshuler | H04L 41/12 706/52 |
| 2005/0170528 A1* | 8/2005 | West | G06K 9/6282 436/518 |
| 2012/0260182 A1* | 10/2012 | Hansen | G06Q 10/00 715/736 |
| 2013/0041860 A1* | 2/2013 | Lawrence | G06Q 10/10 706/46 |
| 2013/0173485 A1 | 7/2013 | Ruiz et al. | |
| 2013/0211848 A1 | 8/2013 | Stupp | |
| 2013/0268516 A1* | 10/2013 | Chaudhri | H04L 65/403 707/722 |

(Continued)

OTHER PUBLICATIONS

Yu et al., "From Micro to Macro: Uncovering and Predicting Information Cascading Process with Behavioral Dynamics", May 2015, pp. 1-10 (Year: 2015).*

(Continued)

*Primary Examiner* — Paulinho E Smith
(74) *Attorney, Agent, or Firm* — L. Jeffrey Kelly

(57) ABSTRACT

A system, method and program product for providing cascade prediction. A system is disclosed having: a computing system for receiving observed cascade data, wherein the observed cascade data includes a set of nodes impacted prior to a preliminary time; a sub-cascade processing engine that determines a sub-cascade size of each node in the set of nodes; survival analysis system that utilizes a networked Weibull regression to determine a survival rate of each node in the set of nodes; and a calculation system that applies the survival rate to the sub-cascade size of each node in the set of nodes to generate a predicted cascade size at a future time.

11 Claims, 5 Drawing Sheets

(56) References Cited

U.S. PATENT DOCUMENTS

| | | | |
|---|---|---|---|
| 2014/0143012 A1 | 5/2014 | Alon et al. | |
| 2014/0279527 A1 | 9/2014 | Duke et al. | |
| 2015/0081560 A1 | 3/2015 | Grossman et al. | |
| 2015/0134402 A1 | 5/2015 | Barbieri et al. | |
| 2017/0169335 A1* | 6/2017 | Bai | G06N 5/022 |
| 2017/0221168 A1* | 8/2017 | Baughman | G06F 16/24578 |
| 2019/0034809 A1* | 1/2019 | Xu | G06N 5/022 |

OTHER PUBLICATIONS

Galuba et al., "Outtweeting the Twitterers—Predictiong Information cascades in Microblogs", Proceedings of the 3rd Wonference on Online Social Networks, 2010, pp. 1-9 (Year: 2010).*

Xie et al., "Modeling Cascades Over Time in Microblogs", Oct. 29, 2015, Big Data '15, Proceedings of the 2015 IEEE International Conference on Big Data (Big Data), pp. 677-686 (Year: 2015).*

Sadilek et al., "Predicting Disease Transmission from Geo-Tagged Micro-Blog Data", 2012, Proceedings of the Twenty-Sixth AAAI Conference on Artificial Intelligence, pp. 136-142 (Year: 2012).*

Hakim et al.; "Predicting Information Cascade on Twitter Using Support Vector Regression", Data and Software Engineering (ICODSE), 2014 IEEE International Conference On, Nov. 26-27, 2014, pp. 1-6.

Bild et al.; "Aggregate Characterization of User Behavior in Twitter and Analysis of the Retweet Graph", Journal ACM Transactions on Internet Technology (TOIT), Special Issue on Foundations of Social Computing, vol. 15, Issue 1, Article 4, Feb. 2015, pp. 1-17.

Rattanaritnont et al.; "Analyzing Patterns of Information Cascades Based on User's Influence and Posting Behaviors", TempWeb'12, Proceedings of the 2nd Temporal Web Analysis Workshop, Apr. 16-17, 2012, pp. 1-8.

Cheng et al., "Can Cascades be Predicted?," 2014, 11 pages, Proceedings of the 23rd International Conference on World Wide Web.

Cui et al., "Cascading Outbreak Prediction in Networks: A Data-Driven Approach," Aug. 2013, 9 pages, Proceedings of the 19th ACM SIGKDD International Conference on Knowledge Discovery and Data Mining.

Domingos et al., "Mining the Network Value of Customers," 2001, 10 pages, Proceedings of the Seventh ACM SIGKDD International Conference on Knowledge Discovery and Data Mining.

Du et al., "Scalable Influence Estimation in Continuous-Time Diffusion Networks," 2013 16 pages, Neural Information Processing Systems (NIPS).

Gomez-Rodriguez, "Modeling Information Propagation with Survival Theory," 2013, 9 pages, Proceedings of the 30th International Conference on Machine Learning.

Myers et al., "On the Convexity of Latent Social Network Inference," 2010, 9 pages, In Advances in Neural Information Processing Systems.

* cited by examiner

Input:
  Set of users $U$ involved in the cascade $C$ before time $t_{limit}$, survival functions of users $S_{u_j}(t)$, predicting time $t_e$;

Output:
  Size of cascade $size(C_{t_e})$;

1: for all user $u_i \in U$ do
2:   creates a subcascade process with $replynum(u_i) = 0$
3:   if $u_i$ is not root node then
4:     $replynum(rp(u_i)) = replynum(rp(u_i)) + 1$
5:   end if
6: end for
7: $sum = 1$
8: for all user $u_i \in U$ do
9:   $deathrate(u_i) = \max\left(1 - S_{u_i}(t_{limit} - t(u_i)), \frac{1}{|V|}\right)$
10:  $fdrate(u_i) = \max\left(1 - S_{u_i}(t_e - t(u_i)), \frac{1}{|V|}\right)$
11:  $sum = sum + \frac{replynum(u_i) \cdot fdrate(u_i)}{deathrate(u_i)}$
12: end for
13: return $size(C_{t_e}) = sum$

Figure 3

| Behavioral features | |
|---|---|
| $follower\_avg\_inflow\_rate$ | average inflow rate of fans to the user, or $\frac{\sum_i retweet(i) \cdot in\_flow(i)}{\sum_i retweet(i)}$ where i is the fans to the user(and the same as following). |
| $follower\_avg\_retweet\_rate$ | average retweet rate of fans to the user, or $\frac{\sum_i retweet(i) \cdot retweet\_rate(i)}{\sum_i retweet(i)}$. |
| $inflow\_rate$ | $inflow\_rate$ of the user. |
| $outflow\_rate$ | $outflow\_rate$ of the user. |
| Structural features | |
| $follower\_number$ | number of the followers to the user. |
| $follow\_number$ | number of users this user follows. |

Figure 4

CASCADE PREDICTION USING BEHAVIORAL DYNMICS

TECHNICAL FIELD

The subject matter of this invention relates to predicting cascades, and more particularly to a system and method of predicting cascades using behavioral dynamics.

BACKGROUND

Cascades occur and are ubiquitous in various connected environments. For example, information cascades can occur in a social media setting when posts or tweets are spread rapidly over a computer network. Similarly, cascades can occur in economic markets, e.g., involving the buying and selling of stock, in transportation, e.g., involving the flow of traffic, in healthcare, e.g., involving the spread of a disease, etc. Regardless of the context, it is very difficult to identify and predict cascades.

Nonetheless, identifying, understanding and predicting how a cascade will behave can be of great value. For example, in cases where a cascade can cause interruptions, resources can be allocated or reallocated to mitigate such problems. While there has been a fair amount of work focused on determining a final cascade size, little has been done to predict cascades at different time intervals, i.e., provide a model of the cascading process.

SUMMARY

Aspects of the disclosure include techniques for modeling cascading processes based on early stage activity and behavioral dynamics of nodes in a network. In a first aspect, the invention provides a cascade prediction system, comprising: a computing system for receiving observed cascade data, wherein the observed cascade data includes a set of nodes impacted prior to a preliminary time; a sub-cascade processing engine that determines a sub-cascade size of each node in the set of nodes; a survival analysis system that utilizes a networked Weibull regression to determine a survival rate of each node in the set of nodes; and a calculation system that applies the survival rate to the sub-cascade size of each node in the set of nodes to generate a predicted cascade size at a future time.

A second aspect discloses a method for predicting cascades, comprising: providing a computing system for receiving observed cascade data, wherein the observed cascade data includes a set of nodes impacted prior to a preliminary time; determining a sub-cascade size of each node in the set of nodes; utilizing a networked Weibull regression to determine a survival rate of each node in the set of nodes; and applying the survival rate to the sub-cascade size of each node in the set of nodes to generate a predicted cascade size at a future time.

A third aspect discloses a computer program product stored on a computer readable storage medium, which when executed by a processor, generates a cascade prediction, the computer program product comprising: programming instructions for receiving observed cascade data, wherein the observed cascade data includes a set of nodes impacted prior to a preliminary time; programming instructions for determining a sub-cascade size of each node in the set of nodes; and programming instructions for utilizing a networked Weibull regression to determine a survival rate of each node in the set of nodes; and programming instructions for applying the survival rate to the sub-cascade size of each node in the set of nodes to generate a predicted cascade size at a future time.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an algorithm/pseudocode for implementing a cascade prediction according to embodiments.

FIG. 4 depicts a table of behavioral and structural features used by the cascade prediction system according to embodiments.

Figure 1:
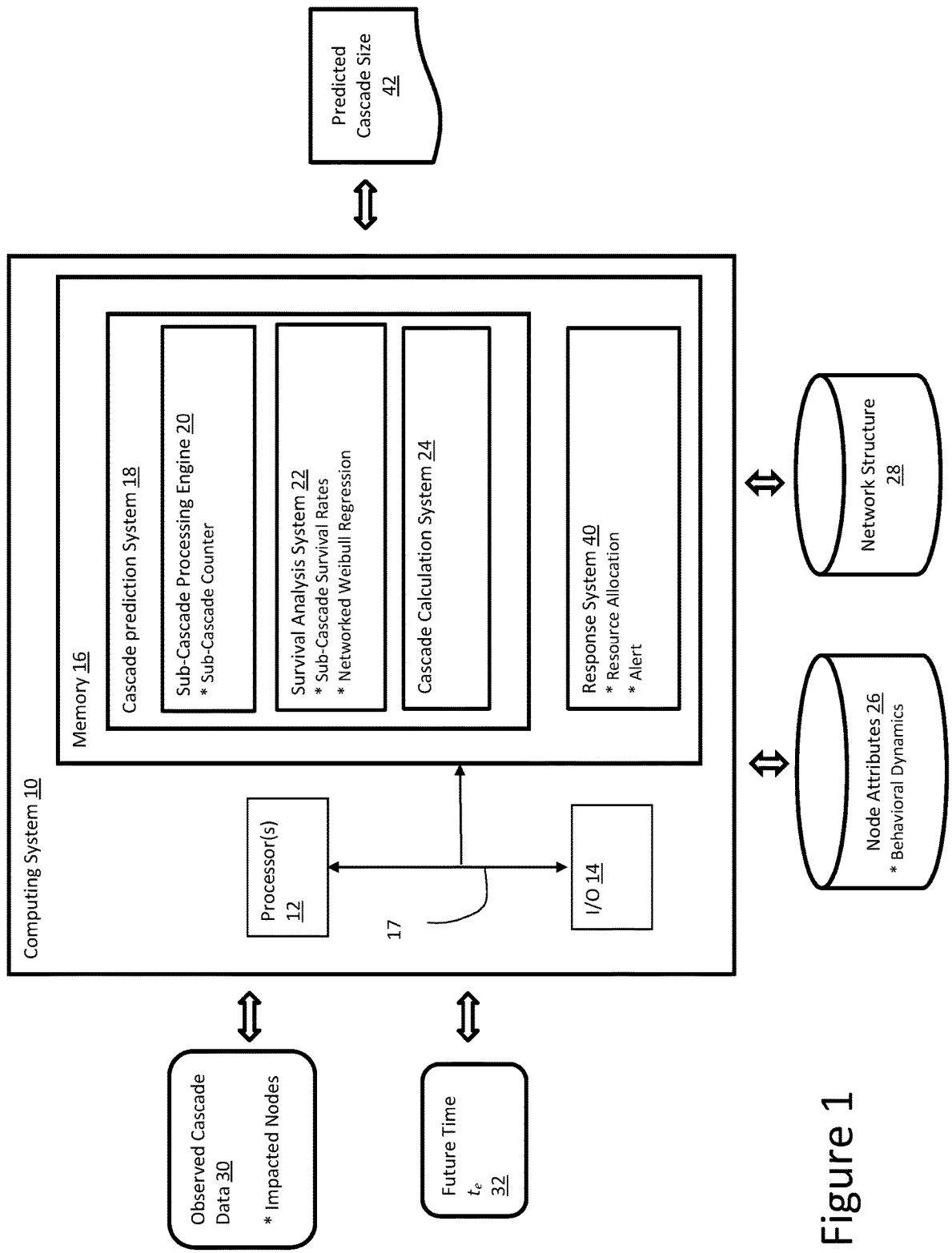
FIG. 1 shows a computing system having a cascade prediction system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 2:
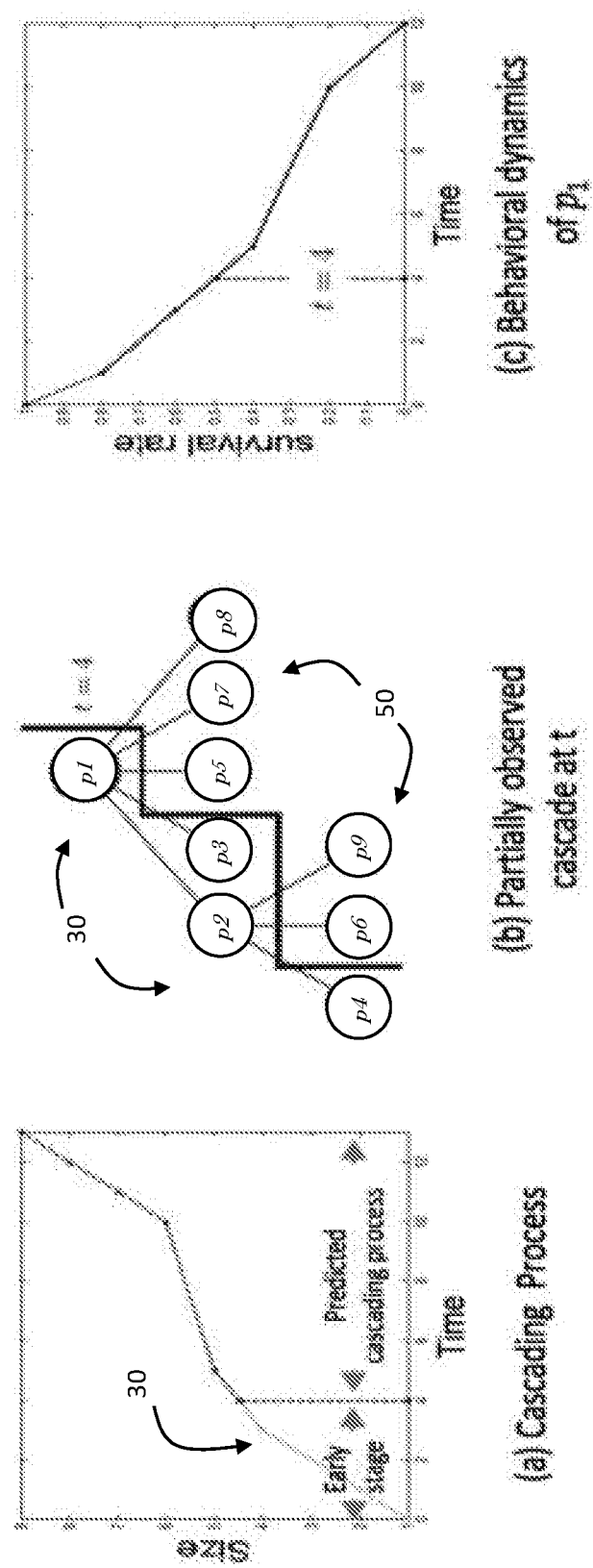
FIG. 2 shows representations of a cascade process according to embodiments.

Referring now to the drawings, FIG. 1 depicts a computing system 10 having a cascade prediction system 18 that predicts a cascade size 42 at a future time $t_e$ 32 based on observed cascade data 30. Observed cascade data 30 generally comprises a set of early stage nodes that have been "impacted" prior to some initial time. For example, FIG. 2 depicts three representations of a cascade process before and after initial time t=4. FIG. 2(a) shows a size of the cascade process as a function of time observed before, and predicted after a preliminary time, t=4. FIG. 2(b) shows a resulting network graph with observed nodes 30 on the left of divider and predicted nodes 50 on the right of the divider. FIG. 2(c) shows a survival rate over time for the cascade process.

Cascade prediction system 18 (FIG. 1) generally includes a sub-cascade processing engine 20 that examines each of the impacted nodes in the observed cascade data 30 and determines a count or size of a sub-cascade up to the future time $t_e$. The size of each sub-cascade is determined by node attributes 26 and the network structure 28. For instance, in a social media setting, the size a of a sub-cascade may be related to the number and historical activity patterns of followers associated with a given user. In addition, a survival analysis system 22 is provided that generates a survival function using a networked Weibull regression for each of the impacted nodes in the observed cascade data 30. Based on the determined sub-cascade size and survival function of each observed node, a cascade calculation system 24 calculates a predicted cascade size 42 at a future time $t_e$.

In addition, a response system 40 may be implemented to provide a response to the predicted cascade size 42. For example, resources may be allocated within a network to meet the requirements of the predicted cascade size 42. Resources may for example include data routing strategies, increased processing capabilities, increased memory allocations, etc. Alternatively, alerts or other types of responses may be implemented to take advantage of a predicted cascade (e.g., advertising or marketing strategies, financial hedging, etc.) or take countermeasures to head it off (e.g., public relation initiatives, software upgrades, etc.).

Cascade prediction system 18 may be applied to any environment in which a cascade process may occur. Common examples include a social media platform, an information technology network, a financial network, a healthcare monitoring system, a disease prediction system, an alert system, a cloud provider, etc.

Implementation Details

Given the behavioral dynamics of node p1, represented by its survival rates, and the number of its offspring nodes that have involved before t, cascade prediction system 18 can predict the cumulative number of its offspring nodes that are involved in the cascade at any time t0>t. After conducting similar predictions on all the observed nodes, the cascading process after t can be predicted by an additive function over all local predictions from behavioral dynamics.

The current approach utilizes a networked Weibull regression model for parameter learning of behavioral dynamics. Besides the maximum likelihood estimation term, the approach also assumes the parameters of a node can be regressed by the behavioral features of its neighbor nodes and thus imposes networked regularizers to improve the interpretability and generality of the model. Based on the behavioral dynamics, the approach uses an additive model for cascading process prediction. Further, to make it scalable, an efficient sampling strategy for approximation with a theoretical guarantee may be employed.

In one embodiment, cascade prediction system 18 may be used to predict a social media cascade process involving a network of followers who may potentially republish (e.g., retweet) a posting (e.g., a tweet). For instance, assume a social network G=<U, A> where U represents the users and A represents the directed relationship of the users. Every user in the graph is also a source; when a message is published, it will affect the followers of the sender and trigger a sequence of retweet posts. A cascade contains a set of posts C={p1, p2, p3 ... pm}, where p1 is a root post and the others are retweet posts. The 'clock' is set to 0 at the start of each cascade. For each post pi, observed cascade data 30 that is known includes: the sender of the post u(pi), the time stamp of the post t(pi), and post rp(pi) where pi is influenced from. The goal is to predict the final size sz(C, $t_{limit}$) of the cascade C, given the posts P sent before time $t_{limit}$. FIG. 2 gives an example of the problem: there is a cascade with size of 9. When the time is at t=4, four posts p1, p2, p3 and p4 are observed. The goal is to find an algorithm to approximate the final size of the cascade.

To achieve this goal, survival analysis is employed using the following survival function:

$$S(t)=Pr\{\tau_0 \geq t\}=\int_t^\infty f(t)$$

Where $\tau_0$ to is a non-negative continuous random variable representing the waiting time until the occurrence of an event with probability density function $f(t)$. The survival function denotes the probability of an event not occurring during duration t. The following hazard rate give another characterization of the distribution of $\tau_0$.

$$\lambda(t) = \lim_{dt \to 0} \frac{Pr(t \leq \tau_0 < t+dt \mid \tau_0 \geq t)}{dt} = \frac{f(t)}{S(t)}$$

Because the survival function of every user is determined using historical data, then the retweet size to each existing post can be estimated based on current information, and thus the cascade size can be determined. Based on experimental results, it was discovered that a Weibull distribution is most suitable by comparing the ks-static of the distribution. Moreover, the shape and scale parameter of users in Weibull distribution is highly correlated to the dynamic structural information of the users.

The Weibull distribution is often used in survival analysis, its probability density function increases rapidly and then decays to zero, which is very consistent with the observations to the retweeting data. Given a particular user i, the corresponding density, survival and hazard functions of the Weibull distribution are:

$$f_i(t) = \frac{k_i}{\lambda_i}\left(\frac{t}{\lambda_i}\right)^{k_i-1} \exp^{-\left(\frac{t}{\lambda_i}\right)^{k_i}}$$

$$S_i(t) = \exp^{-\left(\frac{t}{\lambda_i}\right)^{k_i}}$$

$$h_i(t) = \frac{k_i}{\lambda_i}\left(\frac{t}{\lambda_i}\right)^{k_i-1}$$

where t>0 is the retweet time to user i, $\lambda_i$>0 and $k_i$>0 is the scale and shape parameter of the Weibull distribution to user i.

The likelihood of retweeting dynamics is determined as follows:

Given N users, $T_i$ refers to an $m_i$ elements event-time set of posts retweeted to user i in increasing order (here it is assumed $T_{i,j} \geq 1$ and $T_{i,mi} > 1$). The likelihood of the event data can be written as follow:

$$L(\lambda, k) = \prod_{i=1}^{N}\prod_{j=1}^{m_i}(h_i(T_{i,j}) \cdot S_i(T_{i,j}))$$

$$= \prod_{i=1}^{N}\prod_{j=1}^{m_i}\left(k_i \cdot T_{i,j}^{k_i-1} \cdot \lambda_i^{-k_i} \cdot e^{-T_{i,j}^{k_i} \cdot \lambda_i^{-k_i}}\right)$$

$$\log L(\lambda, k) = \sum_{i=1}^{N} l_i(\lambda_i, k_i)$$

As different users have different parameters, it is very relevant to the network structure that the user is factored in. Thus, let $x_i$ be a 1*r structural feature vector of user i, $\lambda_i$ and $k_i$ can be modulated by the following restriction:

$$\log \lambda_i = \log x_i * \beta$$

$$\log k_i = \log x_i * \gamma$$

Where β and γ are r*1 regression coefficient vectors to λ and k.

The goal is to scale and shape parameters of every user so that the likelihood of the observed data is maximized, while obtaining the coefficient vector so that the parameters of users can be estimate without their event data. The problem is solved by adding an empirical objective and an L1 regularization on β and γ respectively. Combining everything together, the Networked Weibull Regression is arrived at which aims to minimize the following objective:

$$F(\lambda, k, \beta, \gamma) = G_1(\lambda, k) + \mu G_2(\beta, \lambda) + \eta G_3(\gamma, k)$$

$$G_1(\lambda, k) = -\log L(\lambda, k)$$

$$G_2(\lambda, \beta) = \frac{1}{2N}\|\log\lambda - \log X \cdot \beta\|^2 + \alpha_\beta\|\beta\|_1$$

$$G_3(k, \gamma) = \frac{1}{2N}\|\log k - \log X \cdot \gamma\|^2 + \alpha_\gamma\|\gamma\|_1$$

Note that $\mu$ and $\eta$ are the regression coefficients and X is a feature vector. With the behavioral dynamics of users in the network modeled, the predicted size of a cascade can be determined.

One proposed approach is illustrated in the algorithm/pseudocode shown in FIG. 3. When a new post pi occurs, the algorithm will launch a process to estimate the a final number of the sub-cascade to node $u_i$ with temporal size counter replynum($u_i$) and survival function provided by deathrate($u_i$) and fdrate($u_i$). The survival parameters are obtained from the sender of $u_i$. If $u_i$ is a retweeting post, the algorithm also increases the temporal size of the retweet set to its parent node rp($u_i$) by one. After all the information before the deadline is collected, the result will be finalized by aggregating all the values estimated by every process. Note that V is the maximum post number.

FIG. 4 depicts a chart of various behavior features that may be used by the Networked Weibull Regression. The behavioral features include: the average inflow rate of fans to the user; the average retweet rate of fans to the user; the inflow rate of the user; and the outflow rate of the user. Structural features, which may be used to determine an initial sub-cascade size include: the number of followers to the user, and the number of users the current user follows.

Figure 5:
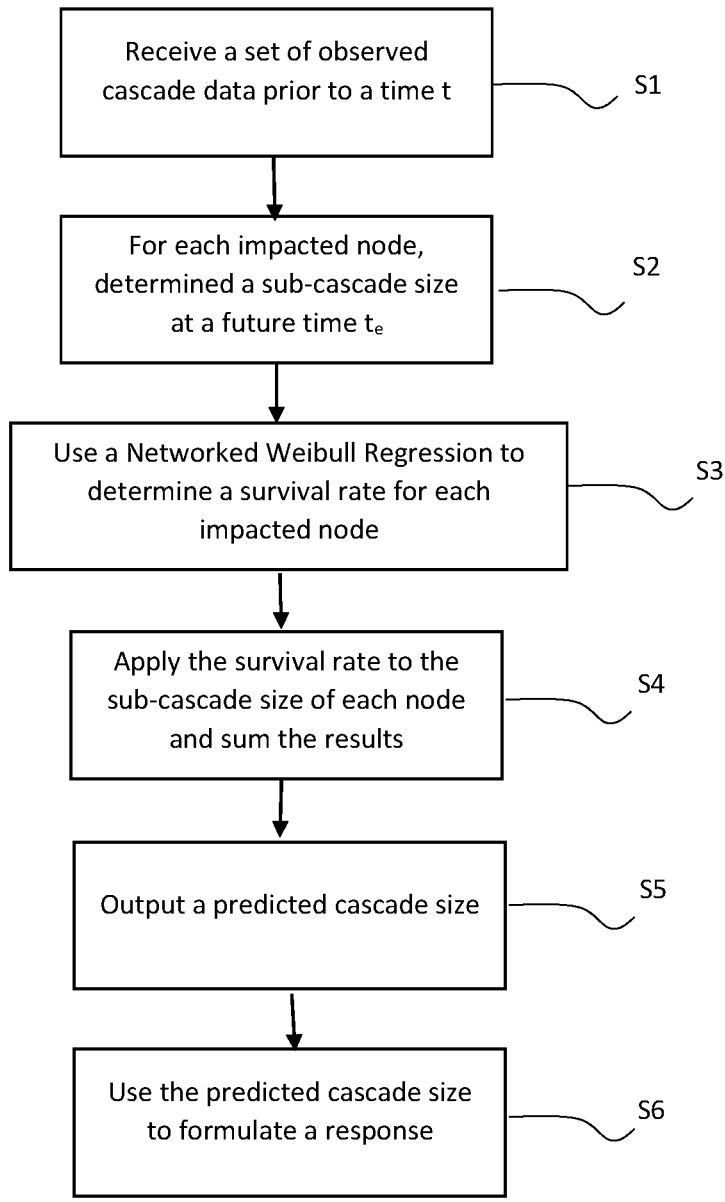
FIG. 5 depicts a flow diagram showing a cascade prediction process according to embodiments.

FIG. 5 depicts a flow diagram of a cascade prediction system 18. At S1, a set of observed cascade data 30 obtained before a time t is received. As noted, observed cascade data 30 includes a set of nodes that have already been impacted by a cascade process. At S2, a sub-cascade size for each impacted node is determined, wherein the size depends on a future time $t_e$. In general, the sub-cascade size is determined from information stored for each node, e.g., who the node is connected to, who the connections are connected to, etc. In addition, temporal information about the rate at which nodes connect is utilized to calculate the size at different points in time.

At S3, a Networked Weibull Regression is used to determine a survival rate for each impacted node. An example of the survival is depicted in FIG. 2(c), which shows that the survival rate decreases over time. The survival rate generally represents the percentage of nodes that have not been, but will be, impacted by the cascade process. At S4, the survival rate is applied to the sub-cascade size of each impacted node, and the results are summed to output a predicted cascade size 42 at S5.

At S6, the predicted cascade size 42 may be used to formulate a response. For example, the associated network may be reconfigured, resources associated with the network may be allocated or re-allocated, alerts may be generated, advertising may be initiated in a social media platform, healthcare precautions may be put in place, financial decisions may be implemented, etc.

It is understood that cascade prediction system 18 may be implemented as a computer program product stored on a computer readable storage medium.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the cascade prediction system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A cascade prediction system, comprising:
   a computing system for receiving observed cascade data, wherein the observed cascade data includes a set of nodes impacted prior to a preliminary time;
   a sub-cascade processing engine that determines a sub-cascade size and survival rate of each node in the set of nodes based on node attributes, wherein the node attributes include an average inflow rate of followers of a user, an average republish rate of followers of the user, an inflow rate to the user, an outflow rate of the user, a number of followers to the user, or a number of other users followed by the user;
   survival analysis system that utilizes a networked Weibull regression to determine a survival rate of each node in the set of nodes; and
   a calculation system that applies the survival rate to the sub-cascade size of each node in the set of nodes to generate a predicted cascade size at a future time.

2. The cascade prediction system of claim 1, wherein the observed cascade data comprises social media activity associated with a plurality of users republishing posts.

3. The cascade prediction system of claim 1, further comprising a response system that utilizes the predicted cascade size to alter a behavior of a network.

4. The cascade prediction system of claim 1, wherein the observed cascade data comprises information relating to a spread of a disease being tracked by a disease monitoring network.

5. A method for predicting cascades, comprising:
   providing a computing system for receiving observed cascade data, wherein the observed cascade data includes a set of nodes impacted prior to a preliminary time;
   determining a sub-cascade size and survival rate of each node in the set of nodes based on node attributes, wherein the node attributes include an average inflow rate of followers of a user, an average republish rate of followers of the user, an inflow rate to the user, an outflow rate of the user, a number of followers to the user, or a number of other users followed by the user;
   utilizing a networked Weibull regression to determine a survival rate of each node in the set of nodes; and applying the survival rate to the sub-cascade size of each node in the set of nodes to generate a predicted cascade size at a future time.

6. The method of claim 5, wherein the observed cascade data comprises social media activity associated with a plurality of users republishing posts.

7. The method of claim 5, further comprising utilizing the predicted cascade size to alter a behavior of a network.

8. The method of claim 5, wherein the observed cascade data comprises information relating to a spread of a disease being tracked by a disease monitoring network.

9. A computer program product stored on a computer readable storage medium, which when executed by a processor, generates a cascade prediction, the computer program product comprising:
   programming instructions for receiving observed cascade data, wherein the observed cascade data includes a set of nodes impacted prior to a preliminary time;
   programming instructions for determining a sub-cascade size and survival rate of each node in the set of nodes based on node attributes, wherein the node attributes include an average inflow rate of followers of a user, an average republish rate of followers of the user, an inflow rate to the user, an outflow rate of the user, a number of followers to the user, or a number of other users followed by the user;
   programming instructions for utilizing a networked Weibull regression to determine a survival rate of each node in the set of nodes; and
   programming instructions for applying the survival rate to the sub-cascade size of each node in the set of nodes to generate a predicted cascade size at a future time.

10. The computer program product of claim 9, wherein the observed cascade data comprises one of social media activity associated with a plurality of users republishing posts and information relating to a spread of a disease being tracked by a disease monitoring network.

11. The computer program product of claim 9, further comprising programming instructions for utilizing the predicted cascade size to alter a behavior of a network.

* * * * *